July 3, 1962

A. GODEL 3,042,500

PROCESS FOR OBTAINING CHEMICAL REACTIONS
IN A FLUIDIZED PHASE AND DEVICES FOR
CARRYING OUT THESE PROCESSES

Original Filed Oct. 28, 1954

INVENTOR
ALBERT GODEL

BY Richards & Geier
ATTORNEYS

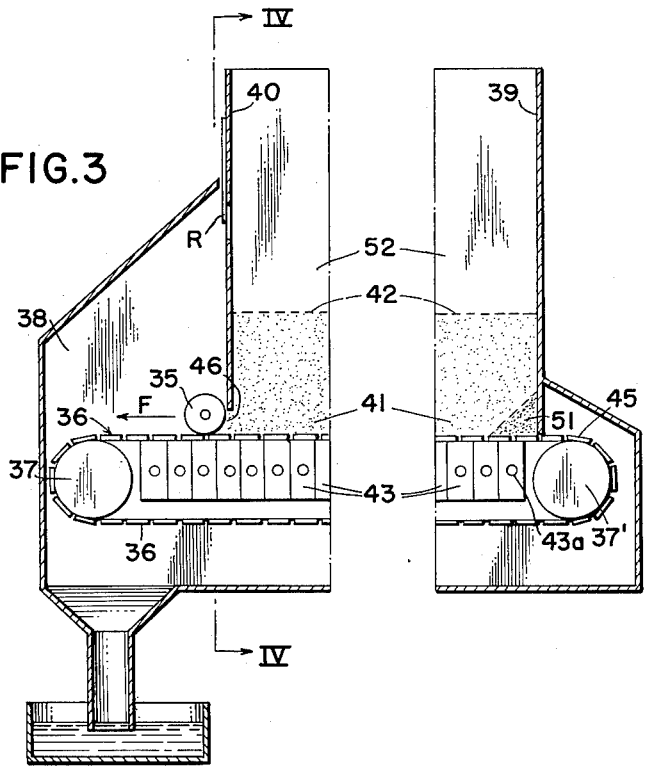
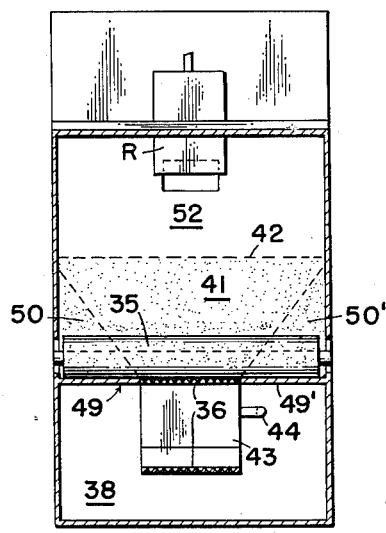

United States Patent Office 3,042,500
Patented July 3, 1962

3,042,500
PROCESS FOR OBTAINING CHEMICAL REACTIONS IN A FLUIDIZED PHASE AND DEVICES FOR CARRYING OUT THESE PROCESSES
Albert Godel, Paris, France, assignor to Compagnie Industrielle de Procedes et d'Applications S.A., Fribourg, Switzerland, a corporation of Switzerland
Original application Oct. 28, 1954, Ser. No. 465,384, now Patent No. 2,866,696, dated Dec. 30, 1958. Divided and this application Aug. 18, 1958, Ser. No. 763,770
Claims priority, application France Oct. 29, 1953
3 Claims. (Cl. 23—284)

The present invention relates to improvements in a method of obtaining reactions between solid granulated substances maintained in a fluid state.

This application is a division of my co-pending patent application, Serial No. 465,384, filed October 28, 1954, now Patent No. 2,866,696.

The use of the customary fluidization reactors entails drawbacks when the reaction products tend to become fusible in the reaction temperature and to form compact agglomerated masses, since these latter coat the lateral wall with injurious scorifications and, since it is not possible to maintain them in aerodynamic suspension, they become settled at the bottom of the reactor, where, owing to their accumulation, they obstruct the blowing orifices.

This drawback is particularly serious in gasification reactions, combustion reactions or in the coking carbonisation reactions of fuels, as the clinkers or large fragments of coke rapidly obstruct the grating.

An object of the present invention is to obviate these drawbacks. For this purpose, it provides, in the main, a process for producing chemical reactions in granulated materials maintained in gaseous suspension, particularly in the fluidized phase, giving rise to the formation of solid masses which settle in said fluid, this process being essentially characterised by the fact that the granulated substance is maintained in fluidized layer hydrostatically equilibrated at all points of the reactor, the solid masses settling as a result of the chemical reaction being caused to accumulate at the base of this layer and then being sorted, after which they are extracted mechanically through said layer.

Generally speaking, in all cases, the means for carrying out the subject matter of the present invention include a conveying device, such as an endless, continuous mechanical grating, traversing the reactor on its path of travel, on which grating rest the granulated substances maintained in a fluidized layer by the insufflation of gas through the grating, the fluidized layer being hydrostatically equilibrated at all points of the reactor and extending as far as the point of emergence of the grating traversing the reactor, the intensity at which the gas is blown at each point of the grating being controlled in order to ensure regular fluidization and to enable the settled agglomerated masses to be taken along with it, fluidized granulated masses being left behind.

The process, constituting the subject matter of the present invention, which pertains to obtaining chemical reactions, is particularly suitable for the combustion of coal fines for the heating of boilers. In that case, the agglomerated masses which are deposited at the bottom of the fluidized layer and which are moved by the transporting means, are the clinkers.

Practical experience has shown that the process, constituting the subject matter of the present invention, makes it possible to burn about 1500 kilograms per hour per square meter of grating surface, which is of considerable advantage over the prior art methods, particularly since through the use of prior art horizontal grating, it is possible to burn only 150 kilograms per square meter per hour.

It is precisely for this reason that the grating of the present invention used for fluidization purposes is from 5 to 10 times smaller than that used in prior art, the grating of the present invention occupying only a central portion of the base of the fluidization reactor, and yet assuring adequate combustion.

According to an embodiment, the grating, again consisting of an endless belt driven mechanically in the direction of emergence, is entirely horizontal. A counter pressure exerted by the gas surmounting the grating at this point enables (possibly by reason of the combined effect of sealing devices placed at the point of exit) the decanted masses alone to be conveyed out of the reactor, excluding the fluidized granulated substances.

These sealing devices may consist either of vertical shutters movable around a horizontal axis, underneath the base of the partition which delimits the reactor at the point of emergence, or of a cylindrical roller with a horizontal axis and resting on the grating, outside the reactor at the exit point.

Although the rectilinear endless-chain type grating presents advantages, the same alternatives can also be considered with a circular grating having a vertical axis, and carrying out a rotary movement around this axis, the emergence zone where the sealing devices may be placed being then radial.

Similarly, in place of a grating across which the fluidization gases are blown, the process provided by the invention could equally well be applied to a device based on the Archimedean screw and arranged in the same manner and performing the same function.

Finally, it has been found that the agglomeration of the solid masses tends to take place against the lateral walls of the reactor, which thereby become coated with scoria.

To combat this drawback, it has already been proposed that these lateral walls should be lined with special refractory materials and also to provide them with moving scraping-devices; it has also been suggested that these lateral walls should be equipped with water jackets, although these latter have the drawback of reducing efficiency by cooling the materials undergoing reaction.

The present invention provides—in order to obviate this type of drawback likewise—for the positioning of the lateral walls of the reactor around the grate and at a considerable distance from the edges of said grate. The distance between the edges of this grate and the point where the lateral walls of the reactor intersect with the base of this latter are sufficient to ensure that an appreciable dead angle is formed, where fluidization cannot take place and in which an embankment or chute-slope is naturally provided for non-fluidized granulated substances; it is obviously necessary for the lateral walls of the reactor to be vertical, or at all events inclined to the vertical at an angle less than that of the natural "chute-slope" for the granulated substances under consideration.

It has been found according to this invention that under these circumstances the surface of this slope is being continually renewed by the projection of fluidized substances to the upper part and by the movement of these substances to the grating.

It has also been found that the agglomerates resulting from this reaction flow out with greater rapidity, automatically accumulating on the grating, whence they can be evacuated by the means previously described.

The artificial production and the use of the embankment offer the double advantage of producing a thermal insulation for the reactor and of isolating the lateral walls from any contact with the scoria, thus obviating the risk that these will adhere to them.

Naturally, the foregoing can only apply insofar as the granulated materials constituting the slope are free of any tendency to agglomerate at the temperature in question, which is the case with anthracite, coke, etc.

In order to limit the agglomeration of the granulated substances forming the slope, various means are provided within the scope of the present invention; a first method consists of cooling the slope by the insertion therein of cooling surfaces more or less parallel to the contact-surface of the non-fluidized mass and of the fluidized mass; a further method consists of entirely or partially feeding the granulated substances to the reactor, not from above or from inside the fluidized layer, but laterally, in the dead angles of the slopes, which are thus entirely renewed, either continuously or intermittently.

This "lateral feed" can be carried out either by a plunge piston or by screws traversing the lateral walls of the reactor.

The invention will appear more clearly from the following detailed description, when taken in connection with the accompanying drawing, showing, by way of example, preferred embodiments of the inventive idea:

FIGURE 3 is analogous to FIGURE 1 and is a longitudinal section, through another embodiment of the invention, and FIGURE 4 is a section along the line IV—IV of FIGURE 3.

Figure 1:
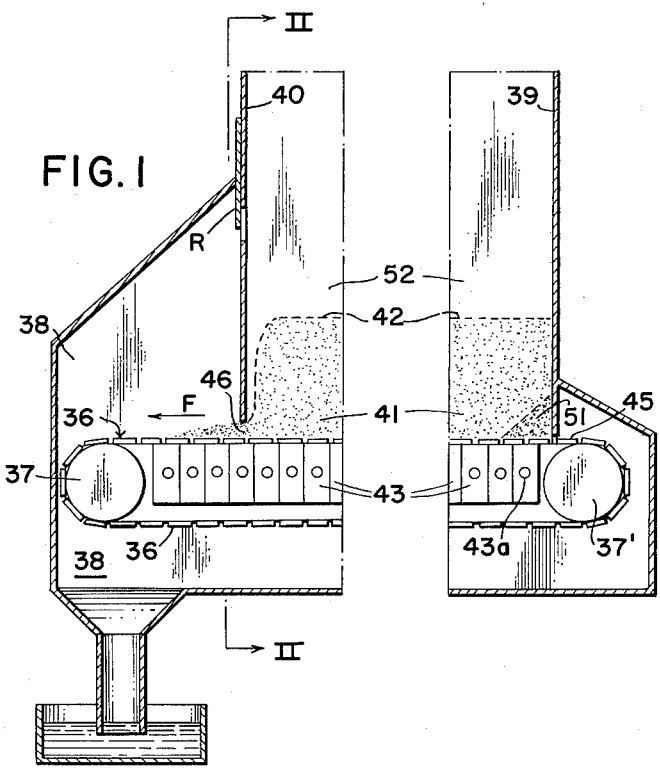
FIGURE 1 is a diagrammatic longitudinal section through an embodiment of the inventive idea.
Figure 2:
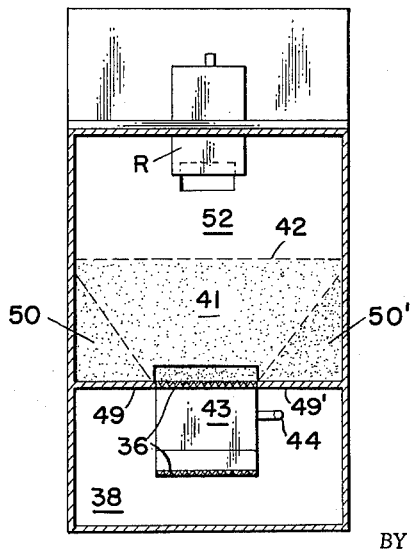
FIGURE 2 is a section along the line II—II of FIGURE 1.

It will be noted that FIGS. 1 and 3 are identical, except for the presence of a roller 35 in FIG. 3, the function of which will be explained in greater detail hereinafter.

The drawings show a horizontal mechanical grating 36 operated by the rollers 37 and 37' with horizontal axes. This grating moves in the direction of the arrow F, within a closed zone 38 which by means of two vertical walls 39 and 40 delimits the reactor 52, in which are maintained, in a fluidized layer 41 at a level 42, a quantity of granulated reagents introduced by all suitable means. Under the grating 36 are arranged "insufflation boxes" 43 fed by a collector 44.

The partition-walls 39 and 40 are arranged, respectively, behind and in front of the upper section of the grating 36, the wall 39 being in contact with the grating 36 at 45 and the wall 40 leaving an orifice or gap 46 between its base and the grating 36.

In the structure shown in FIG. 1, no sealing device is shown in front of this orifice 46. On the other hand, in the construction shown in FIGS. 3 and 4 a drum 35 with a horizontal axis and resting on the grating 36 and forming a tangent to the wall 40, rotates in front of the orifice 46. Finally, in this construction, the second partition wall 40 comprises an upper orifice which is adjustable by means of a damper R.

The operating principle upon which this construction is based will become apparent from reference to FIG. 1, wherein, in the absence of any obturing-device for the orifice 46, it is possible, by a suitable adjustment of the pressure of the gas insufflated through the insufflation boxes 43, on the one hand and of the overpressure prevailing in the enclosure 38, on the other hand, to ensure that the excess pressure prevailing in the enclosure 38 prevents the passage, through the orifice 46, of the fluidized substances, which are thus kept in hydrostatic equilibrium, but nevertheless does not prevent the passage of the non-fluidized agglomerates, which are thus evacuated through the grating 36 out of the reactor proper.

The construction shown in FIGS. 3 and 4 makes it possible, however, for these conditions to be obtained by a more practical method. The drum 35 is mounted on bearings capable of sliding vertically, so as to allow vertical changes in the position of the drum. The enclosure 38 is likewise kept at a pressure slightly above the pressure prevailing in the zone 41, so that the fluidized substance does not tend to flow out through the clearances existing between the drum 35 and the base of the partition wall 40. It can be easily understood that the granulated substance situated in the zone 41 will not be taken along by the grating of any appreciable extent, for this matter is fluid, but, on the other hand, the non-fluidized agglomerates will be crushed under the roller and taken along by the grating. As indicated above, it is also possible to replace the drum by movable shutters which moved upwards when the agglomerates passed through, limiting the out flow at the same time.

It is apparent from FIGS. 1 to 4 that the grating 36 is connected to the lateral walls of the reactor by two surfaces 49, 49', which in the example illustrated are horizontal and on which the "banks" or "slopes" 50 and 50' accumulate. Under the effect of gravity, the free surface of these slopes is constantly renewed, so that there is no reason to fear the adhesion of the material to the walls of the reactor.

Similarly, if the gas-feed of the box 43a at the rear of the grating 36 be cut off, a rear "slope" or "bank" 51 will be formed in the zone 41, which will not merely likewise be constantly renewed by the "collapse" of material but which, in addition, will be renewed by the conveying action of the grating. The advantage offered by this latter "slope" is that it enables the effective insufflation surface of the grating, and thus the power of the reactor, to be reduced at will.

Finally, among one of the numerous other variations which can be contemplated within the scope of this invention, we may mention the construction in which the grating is a circular one and rotates around a vertical axis, the partitions separating the fluidization zone from the rest of the enclosures under pressure being radial partitions, and the "equilising cylinder" for the agglomerates being displaced by a truncated cone (frustum) of decreasing thickness towards the center and likewise arranged radially and tangentially to the second partition wall.

What is claimed is:

1. An apparatus for treating a fluidized granular material, comprising a horizontal endless conveyor having a grating; a reactor having a rear wall contacting the grating of said conveyor adjacent the rear end thereof and a front wall located above said conveyor adjacent the front end thereof and spaced from said grating, whereby a gap is formed through which said conveyor extends, means below said grating for introducing a fluidizing gas under pressure through said grating into a chamber of said reactor defined by said walls thereof, said fluidizing gas being adapted to maintain a granular material in a fluidized layer above said conveyor in said chamber, other walls defining an enclosure within which said front and rear ends of the conveyor are located, means connected with the first-mentioned means for maintaining in said enclosure and outside said gap a pressure preventing the escape of fluidized granular material through said gap so that only the heavier agglomerated masses are carried through the gap by the conveyor, and a movable shutter carried by said front wall above the gap and constituting a sealing device to prevent the escape of the fluidized granular material and of the gas.

2. An apparatus for treating a fluidized granular material, comprising a horizontal endless conveyor having a grating; a reactor having a rear wall contacting the grating of said conveyor adjacent the rear end thereof and a front wall located above said conveyor adjacent the front end thereof and spaced from said grating, whereby a gap is formed through which said conveyor extends, other walls defining an enclosure within which said front and rear ends of the conveyor are located, insufflation boxes located below the grating of said conveyor and extending the entire length thereof, a collector connected with said insufflation boxes for supplying therethrough and through said grating a fluidizing gas under pressure, said fluidizing gas maintaining a granular material in a fluidized layer above said conveyor in a chamber of said reactor extending between said front and rear walls of the reactor, and maintaining in said enclosure and outside said gap a pressure preventing the escape of fluidized granular material through said gap so that only the heavier agglomerated masses are carried through the gap by the conveyor, means forming horizontal surfaces located substantially in the plane of said grating and extending between said grating and the reactor walls for supporting banks of the granular material, and a movable shutter carried by said front wall above the gap and constituting a sealing device to prevent the escape of the fluidized granular material and of the gas.

3. An apparatus for treating a fluidized granular material, comprising a horizontal endless conveyor having a grating; a reactor having a rear wall contacting the grating of said conveyor adjacent the rear end thereof and a front wall located above said conveyor adjacent the front end thereof and spaced from said grating, whereby a gap is formed through which said conveyor extends, means below said grating for introducing a fluidizing gas under pressure through said grating into a chamber of said reactor defined by said walls thereof, said fluidizing gas being adapted to maintain a granular material in a fluidized layer above said conveyor in said chamber, other walls defining an enclosure within which said front and rear ends of the conveyor are located, a vertically adjustable drum carried by said other walls within said enclosure in front of said gap, and a movable shutter carried by said front wall above the gap and constituting a sealing device to prevent the escape of the fluidized granular material and of the gas.

References Cited in the file of this patent

UNITED STATES PATENTS

| | | |
|---|---|---|
| 1,609,188 | Pettit | Nov. 30, 1926 |
| 1,861,452 | Rusby | June 7, 1932 |
| 2,581,575 | Boardman | Jan. 8, 1952 |

FOREIGN PATENTS

| | | |
|---|---|---|
| 310,686 | Great Britain | May 2, 1929 |